J. J. NEWKIRK.
SPRING.
APPLICATION FILED JAN. 14, 1911.
1,064,161.
Patented June 10, 1913.
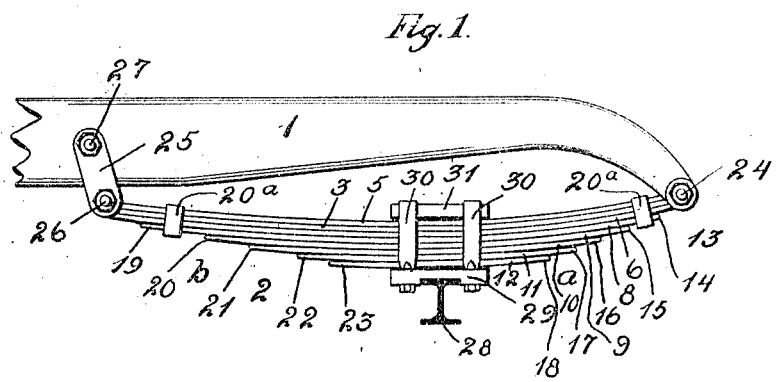
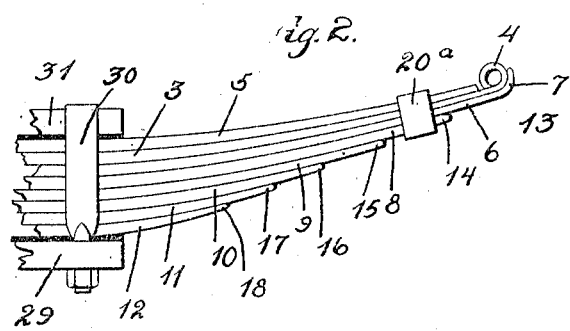
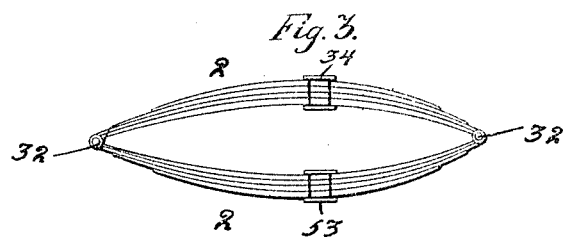
Witnesses:
H. H. Pernstedt.
F. E. Nieding
Inventor:
John J. Newkirk

UNITED STATES PATENT OFFICE.

JOHN J. NEWKIRK, OF CHIHUAHUA, MEXICO.

SPRING.

1,064,161.  Specification of Letters Patent.  Patented June 10, 1913.

Application filed January 14, 1911. Serial No. 602,683.

*To all whom it may concern:*

Be it known that I, JOHN J. NEWKIRK, a citizen of the United States, residing at Chihuahua, Republic of Mexico, have invented certain new and useful Improvements in Springs, of which the following is a specification.

My invention relates to vehicle springs and particularly to such springs formed of a plurality of spring-leaves arranged in juxtaposition and held together so that each spring-leaf while coöperating with the others, fulfils its separate function.

An important object of this invention is to provide a spring of the above character, which is so constructed that the opposite end portions or arms thereof have different degrees of stiffness, whereby a single structure is made to fulfil the functions of a light spring and a heavy spring.

A further object of this invention is to provide a vehicle spring, which is strong, capable of absorbing shocks, to a high degree, and durable.

A further object of this invention is to provide a leaf-spring so constructed that the spring-leaves thereof are not liable to displacement.

Other objects and advantages of this invention will be apparent during the course of the following description.

In the accompanying drawings forming a part of this specification and in which like numerals are employed to designate like parts throughout the same, Figure 1 is a side view of the spring, showing the same applied to a beam of an automobile, Fig. 2 is an enlarged fragmentary side view of a portion of the spring shown in Fig. 1, and Fig. 3 is a side view of a slightly modified form of spring.

It is ordinarily the practice in constructing leaf-springs to form the same symmetrical, that is to say, to have the portion of the spring having the greatest cross-section disposed midway of the ends of said spring, and to have the oppositely extending arms of such spring decrease in cross-section or taper correspondingly toward their outer ends. In counter-distinction to this practice, I construct my leaf-spring so that the portion thereof having the greatest cross-section is nearer one end of the spring than the other. The oppositely extending arms of my spring decrease in cross-section or taper toward their outer ends. The tapering of one of these arms is much more pronounced than that of the other. By this construction the shorter arm of the spring, which is tapered more sharply than the long arm, is much stiffer than said long arm, whereby a single structure is provided having two arms possessing different degrees of stiffness. My spring thus combines in effect, in a single structure, a heavy spring and a light spring. The shocks transmitted to the spring are first received by the lighter arm of the same, then gradually transferred to the heavier or stiffer arm and thus absorbed in the most advantageous manner. The cycle of rebound is exactly the reverse, which results in a greatly diminished strain on and reduced vibration in all parts of the machine.

In the drawings wherein is illustrated a preferred embodiment of my invention, the numeral 1 designates a beam, included within the frame-work of the vehicle. Disposed below this beam is a leaf-spring 2, comprising a spring-leaf 3, having each end thereof bent to form an eye or loop 4, as shown. Disposed above and in engagement with the spring-leaf 3, is a spring-leaf 5, having its ends terminating adjacent the eyes 4. Disposed below and in engagement with the leaf-spring 3, is a spring-leaf 6, which has each end thereof extending beyond the eye 4 and bent upwardly for engagement therewith, as shown at 7. Disposed below the spring-leaf 6 are a plurality of spring-leaves 8, 9, 10, 11 and 12. It is to be understood that the number of spring-leaves may be varied in accordance with the load for which the spring is designed to support. The spring-leaves 8, 9, 10, 11 and 12 are disposed nearer the rear end 13, of the leaf-spring than the forward end thereof, as shown, whereby the portion of the leaf-spring having the greatest cross-section is disposed nearer such rear end. The leaf-spring comprises oppositely extending arms $a$ and $b$, which taper toward their outer ends, as shown. The rear arm $a$ is tapered much more sharply than the forward arm, which results from forming free rear end portions 14, 15, 16, 17 and 18 much shorter than opposite free forward end portions 19, 20, 21, 22 and 23, respectively. The rear arm $a$ possesses a greater degree of stiffness than the forward arm $b$.

The spring-leaves 3, 5, 6 and 8 are held together by bands 20ª, which are disposed near the ends thereof, as shown.

The beam 1 has its rear end bifurcated to receive the eye 4, within which is disposed a bolt 24, serving to pivotally connect the leaf-spring 2 and the beam 1. The forward end of the leaf-spring 2 is pivotally connected with links 25, by means of a bolt 26. The links 25 are in turn pivotally connected with the beam 1, as shown at 27.

The portion of the leaf-spring, having the greatest cross-section extends for the length of the lowermost spring-leaf 23. Disposed below the leaf-spring 2 and midway the ends of the spring-leaf 23, is an axle 28, which is shown as being I-shaped in cross-section. The axle 28 is provided at its ends with spindles (not shown) for the reception of wheels. The axle 28 is rigidly connected with a plate 29, which in turn is connected with the leaf-spring 2 by means of clamps 30. The upper portions of these clamps engage a block of wood 31, as shown.

In Fig. 3, I have illustrated a slightly modified form of the invention, the same including a pair of the leaf-springs 2, pivotally connected at their ends, as shown at 32. The construction of each of the leaf-springs 2 of Fig. 3, is exactly like the leaf-spring 2 shown in Figs. 1 and 2. In Fig. 3, the lower leaf-spring 2 carries means 33, to connect the same with the axle of a vehicle. The upper leaf-spring 2 carries means 34, to connect the same with the body portion of the vehicle. The means 33 and 34 are arranged much nearer corresponding ends of the leaf-springs 2.

In the use of my leaf-spring, the shocks transmitted to the same are first received by the lighter arm $b$ and gradually transferred to the heavier or stiffer arm $a$, whereby such shocks are most advantageously absorbed. I have found that my leaf-spring saves the vehicle to which the same is applied and is itself of very long life.

I wish it understood that the form of my invention herewith shown and described is to be taken as a preferred example of the same and that certain changes in the shape, size and arrangement of parts may be resorted to without departing from the spirit of my invention or the scope of the subjoined claim.

Having thus described my invention, I claim:—

In combination, a leaf-spring comprising, a plurality of superposed spring-leaves which decrease in length downwardly and more prominently at corresponding ends thereof, whereby the leaf-spring will have short and long arms which are respectively stiff and resilient, the uppermost spring-leaf being foreshortened so that the free ends of the second spring-leaf from the top may extend therebeyond and be bent upwardly to form eyes; the third spring-leaf from the top having its ends bent upwardly to form curved portions for receiving the eyes to reinforce and stiffen them. Sleeves surrounding only the first four spring-leaves from the top to properly bind them together, flat plates disposed above and below the leaf-spring at the enlarged portion thereof, U-shaped bolts connecting the plates, and an axle rigidly connected with the lower plate.

In testimony whereof I affix my signature in presence of two witnesses.

JOHN J. NEWKIRK.

Witnesses:
F. T. ANDERSON,
F. E. STEVENSON.